Oct. 9, 1962   E. B. JACOBSON   3,057,262
REMOTELY CONTROLLED REAR VIEW MIRRORS AND THE LLKE
Filed June 15, 1959   3 Sheets-Sheet 1
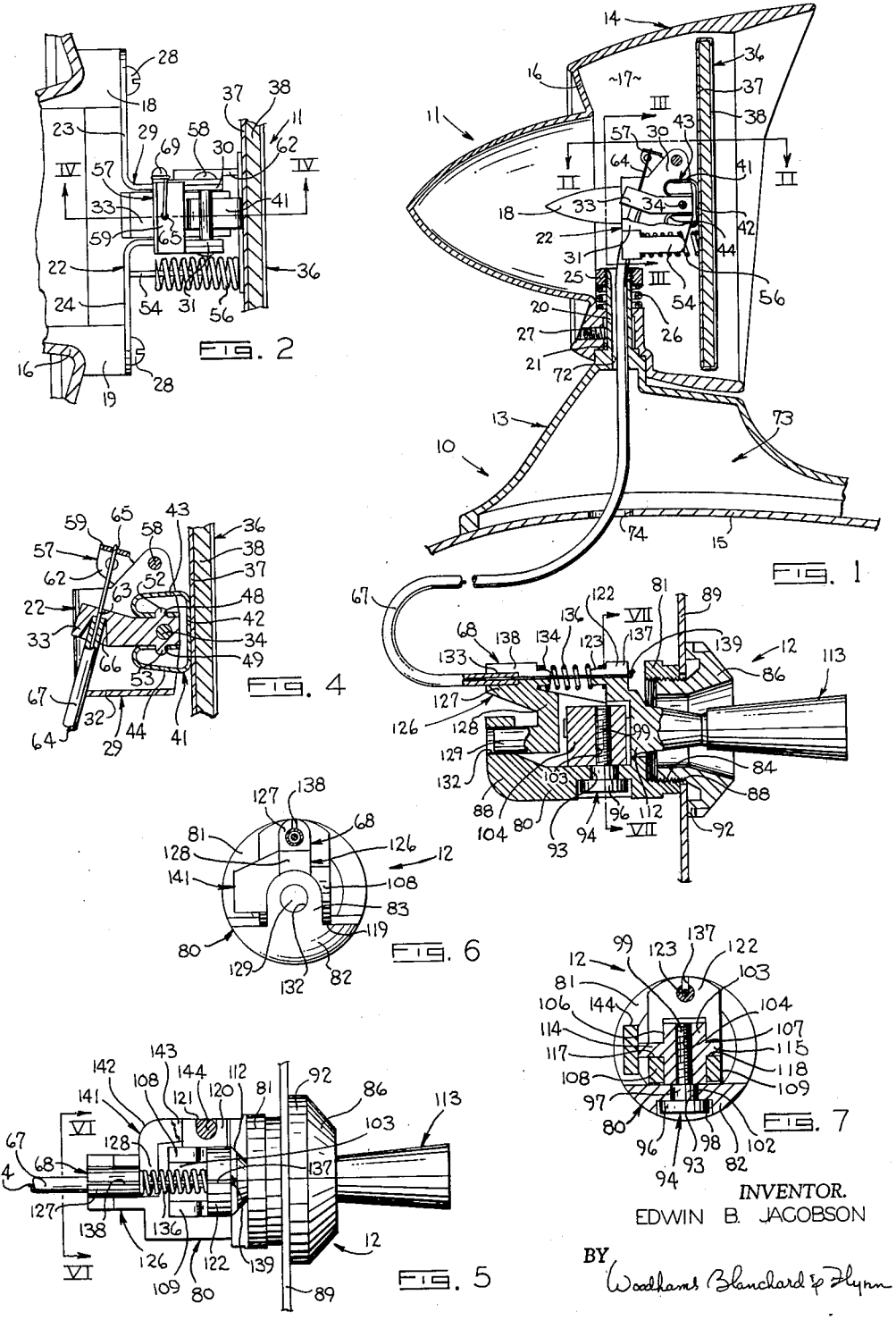
INVENTOR.
EDWIN B. JACOBSON
BY
Woodhams Blanchard & Flynn
ATTORNEYS

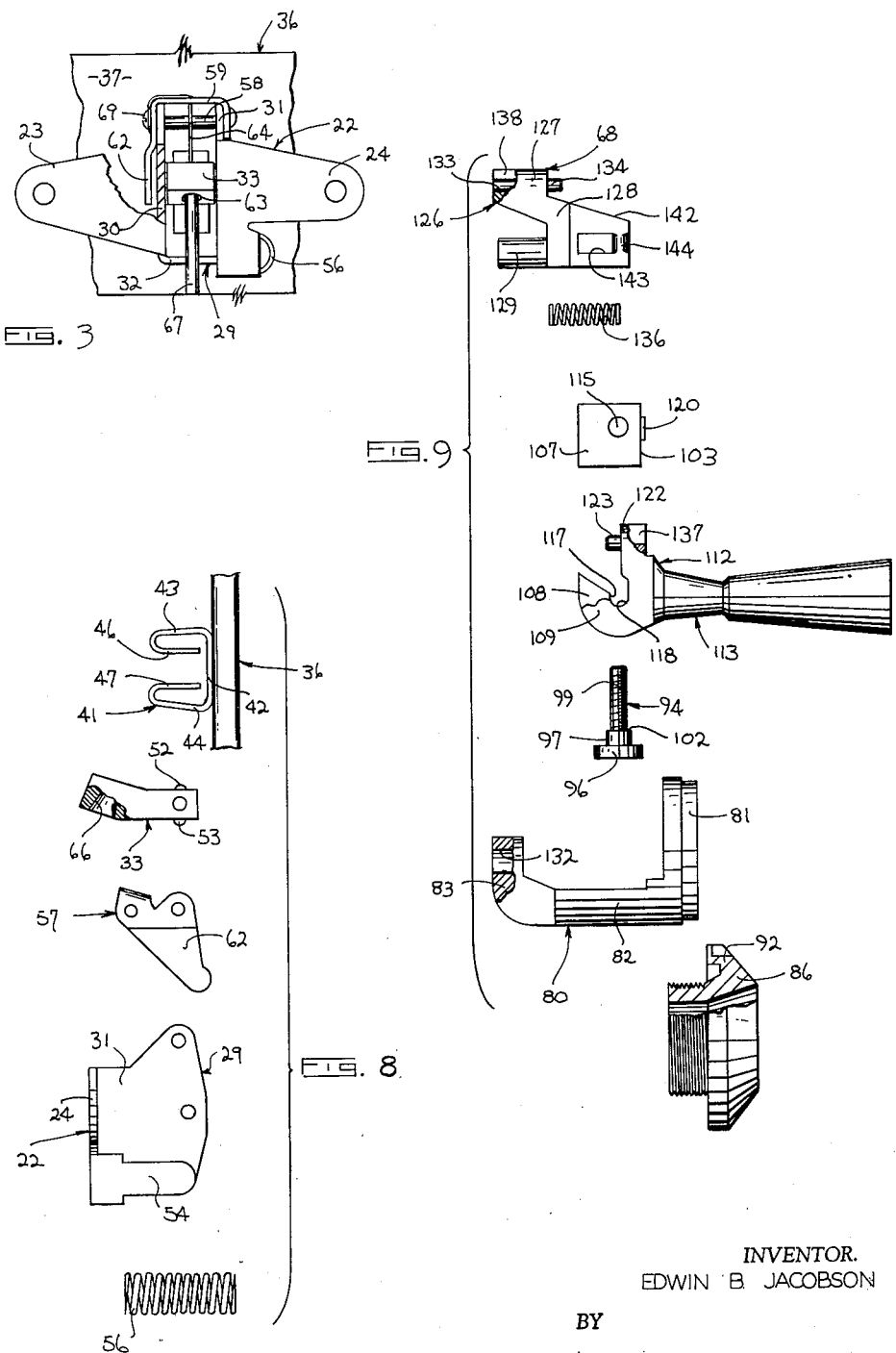

Oct. 9, 1962 E. B. JACOBSON 3,057,262
REMOTELY CONTROLLED REAR VIEW MIRRORS AND THE LIKE
Filed June 15, 1959 3 Sheets-Sheet 3
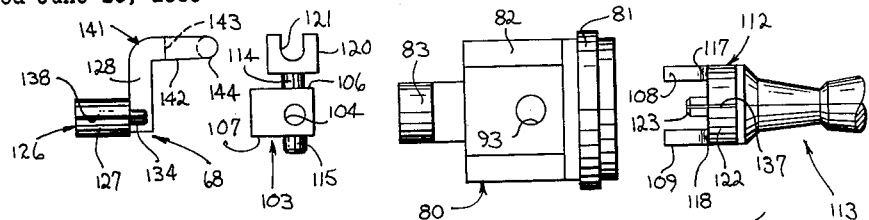
FIG. 10
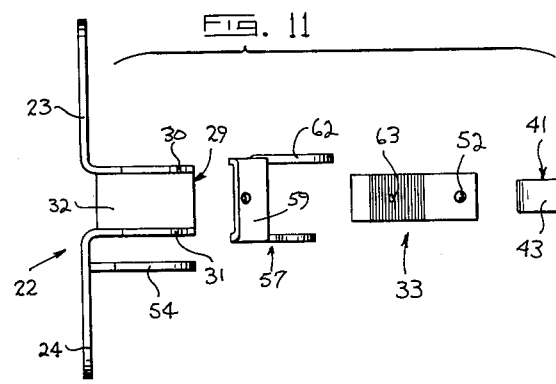
FIG. 11
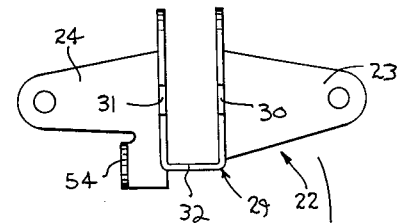
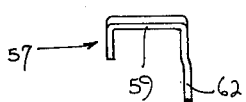
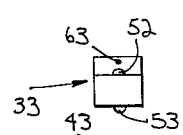
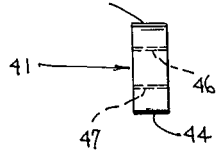
FIG. 12
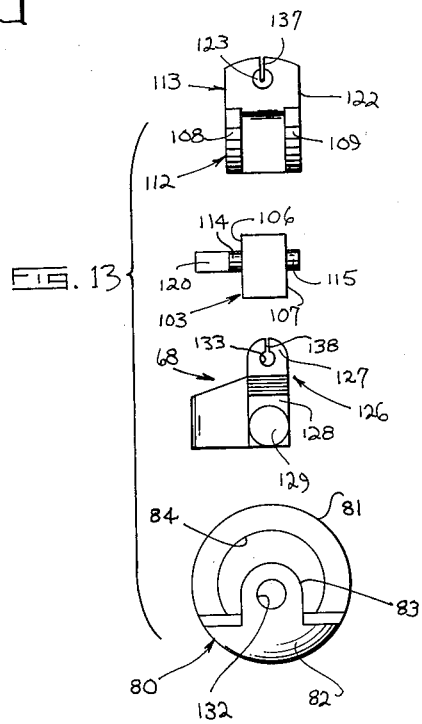
FIG. 13
INVENTOR.
EDWIN B. JACOBSON
BY
Woodhams Blanchard & Flynn
ATTORNEYS

United States Patent Office 3,057,262
Patented Oct. 9, 1962

3,057,262
REMOTELY CONTROLLED REAR VIEW MIRRORS AND THE LIKE
Edwin B. Jacobson, Grand Rapids, Mich., assignor to Jervis Corporation, Grandville, Mich., a corporation of Michigan
Filed June 15, 1959, Ser. No. 820,393
8 Claims. (Cl. 88—93)

This invention relates in general to an adjustable rearview mirror assembly having a manually operable device for remotely controlling the adjustment of the reflective member in said mirror assembly and, more particularly, to mechanism whereby the reflective member can be pivoted around a pair of transverse axes by means of a pair of elongated flexible elements, such as a casing and cable extending therethrough, which are connected between said control device and said reflective member.

The many advantages of an adjustable, rearview mirror assembly having a simple, manually operable device for effecting remote adjustment of the reflective member are well known. For example, the reflective member can be mounted at a variety of different locations on the vehicle with which said assembly is used while permitting the operator to adjust the reflective member without leaving the operator's position within the vehicle. Other advantages of a remotely adjustable rearview mirror assembly, and particularly one utilizing two elongated, flexible elements in combination with a reaction member for effecting the remote control of the reflective member, are set forth in further detail in a copending application Serial No. 818,669 filed by me on 1959 June 8 for Remote Control Structure For Rearview Mirrors and The Like and assigned to the assignee of this application.

In a continuing effort to improve upon the control mechanism for remotely adjustable rearview mirror assemblies, it was discovered that satisfactory control could be effected by means of a single, elongated, flexible element in combination with a substantially coextensive casing in which said element is snugly, but slidably, disposed. However, it is necessary to provide linkage at the connections of said element and casing with the reflective member and the remote device so that each of said element and casing can be moved with respect to the other. The linkage, the casing and the elongated element are arranged so that one of the casing and element controls pivotal movement of the reflective member around one axis and the other controls such movement around the other axis. Moreover, the casing and element are also arranged by means of said linkage so that they both act as reaction members for each other. It is important in this invention that the movement of the manual actuator of the control device corresponds in direction to the movement of the reflective member for the operator's convenience in adjusting the reflective member. It is also important that both movements be substantially universal, at least to a limited extent.

Accordingly, a primary object of this invention has been the provision of an improved, adjustable rearview mirror assembly having a reflective member pivotally supported for movement around either and both of a pair of transverse axes by means of a pair of elongated, flexible and substantially coextensive elements, one of which may be a casing surrounding the other element, and both elements being connected to and between said reflective member and a manually operable control device.

A further object of this invention has been the provision of a mirror assembly, as aforesaid, wherein the control device for effecting two-element manipulation of the reflective member in said mirror assembly can be easily operated through a pattern corresponding to the resultant movements produced in the reflective member, thereby facilitating the adjusting procedure.

A further object of this invention has been the provision of a mirror assembly, as aforesaid, which can be produced inexpensively, which is easy to fabricate and to assemble, which can be installed easily and quickly without the use of special tools, and which requires little or no maintenance due to wear, even though said mirror assembly is used continuously under rigorous operating conditions.

A further object of this invention has been the provision of a mirror assembly, as aforesaid, which is pleasing in appearance, which is rugged in construction and which will tend to remain in adjustment after being properly adjusted, even though the conditions under which it is used are rigorous.

Other objects and purposes of this invention will become apparent to persons familiar with this type of equipment upon reading the following specification and examining the accompanying drawings, in which:

FIGURE 1 is a broken, central cross-sectional view of a remotely controllable rearview mirror assembly embodying the invention.

FIGURE 2 is a sectional view taken along the line II—II in FIGURE 1.

FIGURE 3 is a sectional view taken along the line III—III in FIGURE 1.

FIGURE 4 is a sectional view taken along the line IV—IV in FIGURE 2.

FIGURE 5 is a top view of the manually operable control device shown in FIGURE 1.

FIGURE 6 is a sectional view taken along the line VI—VI in FIGURE 5 and rotated 90° clockwise.

FIGURE 7 is a sectional view along the line VII—VII in FIGURE 1.

FIGURE 8 is an exploded, partially broken side view of the parts in the control mechanism of the slave unit.

FIGURE 9 is an exploded, partially broken, side view of the control device.

FIGURE 10 is an exploded, top view of part of said control device.

FIGURE 11 is an exploded, top view of part of the slave unit.

FIGURE 12 is an exploded, rear view of part of the slave unit.

FIGURE 13 is an exploded, front view of part of the control device.

For the purpose of convenience in description, the terms "upper," "lower" and derivatives thereof will have reference to the rearview mirror assembly and parts thereof as appearing in FIGURE 1. The terms "front," "rear" and derivatives thereof, as applied to the mirror assembly, will have reference to the normal direction of movement of a vehicle upon which said assembly is mounted. The terms "inner," "outer" and derivatives thereof will have reference to the geometric center of said mirror assembly and parts thereof.

GENERAL DESCRIPTION

The objects and purposes of the invention, including those set forth above, have been met by providing an adjustable rearview mirror assembly comprised of a slave unit which is supported upon a portion of the vehicle, such as a front fender, and a control device which may be mounted upon the instrument panel of the vehicle near the operator's position. The reflective member of the slave unit is connected to the manually operable actuator on the control device by a pair of flexible, elongated and substantially coextensive elements held adjacent each other and against buckling. One of said elements may be a wire and the other of said elements may be a casing in which said wire is snugly but slidably disposed.

The manual actuator is pivotally supported for pivotal movement in any direction, at least to a limited extent, away from a central or neutral position. Pivotal movement of said manual actuator in a desired direction preferably effects a corresponding adjustment of the reflective member in a correspondingly desired direction around either or both of a pair of transverse axes. Said axes define a plane which is spaced from, and substantially parallel with, the plane of the reflective member when it is in a median or base position. Means are provided for adjusting the median position according to the location of the slave unit on the vehicle with which said mirror assembly is used. When the reflective member is in such median position, it is situated for optimum use by the vehicle operator and it can be adjusted in any direction away from said median position by means of the control device.

Detailed Construction

The rearview mirror assembly 10 (FIGURE 1), which illustrates one embodiment of the invention, is comprised of a slave or controlled unit 11 and a master unit or control device 12. The slave unit 11 includes a pedestal 13, which may be mounted upon the front fender 15 of a conventional automotive vehicle, and a substantially cup-shaped hood 14 which opens rearwardly and is pivotally supported on the pedestal 13 for movement around an axis passing through the central axis of the hood.

The hood 14 (FIGURE 1) has a front end wall 16 and a side wall 17 which, in this particular embodiment, has a circular cross section. The pedestal 13 has an integral, hollow and substantially cylindrical post 20 extending from its upper end and slidably receivable into a cylindrical post opening 21 through the lower portion of the side wall 17 of the hood 14. The upper end of the post 20 extends into the hood 14 and is externally threaded for engagement by a nut 25. Resilient means, such as the spiral spring 26, is sleeved upon the post 20 between the nut 25 and the adjacent portion of the side wall 17 of the hood 14. A set screw 27 is received through a suitable threaded opening in the front wall 16 for engaging and holding the post 20 in the adjusted position. The central axis of the post 20 is preferably substantially perpendicular to the central axis of the hood 14.

A pair of spaced, integral bosses 18 and 19 (FIGURE 2) extend rearwardly from the front wall 16 within the hood 14, preferably on opposite sides of the vertical axis of the post 20. A substantially T-shaped bracket 22 (FIGURES 2 and 3) has a pair of flanges 23 and 24 which are secured by any suitable means, such as the screws 28, to the rear end of the bosses 18 and 19 so that the stem portion 29 of the bracket 22 extends rearwardly along the central axis of the hood 14.

The stem portion 29 of the bracket 22 (FIGURES 11 and 12) is substantially U-shaped and has upwardly extending legs 30 and 31 which are secured along the corresponding front edges thereof to the flanges 23 and 24, respectively. The web 32 of the U-shaped stem portion 29 is disposed between the lower edges of the legs 30 and 31, which are preferably parallel with each other.

A pivot arm 33 (FIGURES 4, 8, and 11) is pivotally supported near one of its ends upon and between the legs 30 and 31 (FIGURE 3) by means of the pivot pin 34 (FIGURE 4) for movement around an axis which is substantially parallel with the web 32 and located near the rearward edges of the legs 30 and 31, approximately midway between their upper and lower ends. The rear end of the pivot arm 33 is preferably, but not necessarily, approximately flush with the rearward edges of the legs 30 and 31 when said arm is in a substantially horizontal position. The front end of the pivot arm 33 is likewise approximately flush with the front edges of the legs 30 and 31.

A reflective member 36 (FIGURE 1), which is disposed within the hood 14, is comprised of a mirror 38 mounted upon a backing plate 37, both of which are substantially circular in this particular embodiment. A substantially U-shaped spring clip 41 (FIGURES 4 and 8) is arranged with its web 42 rigidly secured, as by welding, to the central portion of the backing plate 37 on the opposite side thereof from the mirror 38. The resiliently flexible legs 43 and 44 of the clip 41 have end portions 46 and 47, respectively, which are folded back toward each other and toward the web 42 for reception of the rearward end of the pivot arm 33 therebetween. The folded portions 46 and 47 (FIGURE 4) embrace the upper and lower surfaces of the pivot arm 33 on the opposite sides of the pivot pin 34. The folded portions 46 and 47 have aligned openings 48 and 49, respectively, into which the projections 52 and 53 on the upper and lower sides of the arm 33 are slidably and removably received. The projections 52 and 53 are preferably disposed on diametrically opposite sides of the pivot pin 34 and, when engaged by the folded portions 46 and 47, hold the reflective member 36 substantially perpendicular to the lengthwise extent of the arm 33. The legs 43 and 44 of the spring clip 41 extend frontwardly between, and are spaced from the legs 30 and 31 of the stem portion 29, whereby said clip 41 and the reflective member 36 carried thereon can be pivoted around the common, substantially vertical axis of the projections 52 and 53, hence with respect to the pivot arm 33. Pivotal movement of the reflective member 36 around a substantially horizontal axis is dependent upon movement of the pivot arm 33 around the pin 34.

The flange 24 (FIGURES 8 and 11) on the bracket 22 has an integral, rearwardly extending guide element 54 which is spaced from the reflective member 36 (FIGURE 2). Resilient means, such as the spiral spring 56, is supported upon the guide element 54 and held under compression thereby against the backing plate 37 when the reflective member 36 is supported upon the arm 33 and the arm 33 is mounted upon the bracket 22 in their normal positions of operation. The guide element 54, hence the lengthwise axis of the spring 56, is located below a horizontal plane including the pivot axis of the pin 34 and spaced sidewardly from a substantially vertical plane including the pivot axis of the projections 52 and 53, said vertical plane being substantially perpendicular to the backing plate 37. Thus, the compressed spring 56 simultaneously urges pivotal movement of the reflective member 36 around the axis of the pivot pin 34 in a counterclockwise direction as seen in FIGURES 1 and 4 and around the axis of the projections 52 and 53 in a counterclockwise direction as seen in FIGURE 2.

A substantially U-shaped control lever 57 (FIGURES 8, 11 and 12) is pivotally supported upon the upper ends of the legs 30 and 31 (FIGURE 2) of the stem portion 29 by means of the lever pin 58 (FIGURE 3), which is substantially directly above and parallel with the pivot pin 34. The web 59 of the lever 57 is disposed at the frontward end thereof and one leg 62 extends substantially beyond and below the lever pin 58 for engagement with the backing plate 37 at a point preferably adjacent to, if not within, the horizontal plane through the axis of the pivot pin 34. Such point of contact between the leg 62 and the backing plate 37 is also on the opposite side of the spring clip 41 from the spring 56.

The front end of the pivot arm 33 (FIGURE 1) has a vertical cable opening 63 (FIGURE 4) near its frontward end which is transverse of the pivot pin 34. An elongated, flexible element or cable 64 slidably extends through the cable opening 63 in said arm 33 and through a cable opening 65 in the web 59 of the lever 57 to which said cable 64 is secured by means of a screw 69 (FIGURE 2). The cable opening 63 is counterbored at its lower end to provide a casing recess 66 into which one end of the cable casing 67 is snugly received.

The casing 67 snugly and slidably embraces the flexible element 64 substantially throughout its length and particularly between the pivot arm 33 and the slide member 68 (FIGURES 1 and 9) on the control device 12. The casing 67 and the flexible element 64 extend from the lever 33, through the central opening 72 in the post 20, through the cavity 73 in the pedestal 13, and through the opening 74 in the fender 15 for connection of both to appropriate parts of the control device 12, as set forth hereinafter.

The master or control device 12 (FIGURES 1 and 5) is comprised of a substantially L-shaped base member 80 (FIGURES 9 and 13) having a hollow, circular and upright rear flange 81 and a horizontal, frontwardly extending lower flange 82. The lower flange 82 has at its front end an upwardly extending, integral guide projection 83. The circular opening 84 in the rear flange 81 is threaded for reception of the externally threaded, lock collar 86. As shown in FIGURE 1, the lock collar 86 is slidably receivable through an opening 88 in the dash panel 89 of an automotive vehicle for engagement with said flange 81, and said collar has an annular outwardly projecting flange 92 on its rearward end which clamps the adjacent portion of the dash panel 89 snugly against the rear flange 81, thereby holding the base member 80 in position with respect to said panel 89.

The lower flange 82 (FIGURES 1 and 7) has a circular pivot opening 93 therethrough between the rear flange 81 and the guide projection 83. A pivot pin 94 has a smooth shank 97 which is of substantially the same diameter as said pivot opening 93 for snug rotatable reception therewithin. The pivot opening 93 has an enlarged portion 98 (FIGURE 7) at its lower end for loose rotatable reception of the head 96 on the lower end of the pin 94. The thickness of the lower flange 82 between the upper surfaces thereof and the upper end of the enlarged portion 98 of the pivot opening 93 is slightly less than the axial length of the smooth shank 97. The outer or upper end 99 of the pivot pin 94 is externally threaded and of slightly less outside diameter than the smooth shank 97 to provide a shoulder 102 between the threaded portion 99 and the shank 97. A pivot block 103 (FIGURES 1 and 7) is supported upon the upper surface of the lower flange 82 and has a threaded opening 104 therein into which the upper threaded end of the pivot pin 94 is threadedly received until the shoulder 102 on the smooth shank 97 is snugly engaged with the lower surface of said block 103, whereby said block and pin 94 are rotatably supported upon the lower flange 82 for movement around a substantially vertical axis.

The pivot block 103 (FIGURES 1, 7, 10 and 13) has a pair of parallel, substantially flat side walls 106 and 107 which are snugly and slidably embraced by the legs 108 and 109 (FIGURES 5 and 10), respectively, of a fork 112 at the front end of the manually engageable actuating member 113. The pivot block 103 has a pair of coaxial stub shafts 114 and 115 (FIGURES 7 and 10) extending from the central portions of the side walls 106 and 107, respectively, and are pivotally engaged within coaxial arcuate recesses 117 and 118 (FIGURES 9 and 10) in the upper edges of the legs 108 and 109. The lower and front edges of the legs 108 and 109 (FIGURE 9) are curved on a radius around the common axis of the arcuate recesses 117 and 118, which radius is slightly less than the distance between said common axis of the stub shafts 114 and 115 and the lower surface of the pivot block 103.

Thus, the actuating member 113 can be pivoted around the stub shafts 114 and 115 (FIGURE 5), hence with respect to the base member 80. Because of the pivotal support of the pivot block 103 (FIGURE 2) upon the base member 80 by means of the pivot pin 94, said actuating member 113 can also be pivoted around the vertical axis of pivot pin 94 which, in this particular embodiment, perpendicularly intersects the common axis of the stub shafts 114 and 115.

The outer end of the stub shaft 115 (FIGURE 10) has an integral yoke 120 defining an outwardly opening, vertical slot 121. The yoke 120 is disposed adjacent to, and is spaced outwardly from the outer surface of the leg 109 so that said yoke 120 does not interfere with the pivotal movement of the fork 112 around the stub shafts 114 and 115. The fork 112 of the actuating member 113 has an integral, upwardly extending flange 122 (FIGURES 9 and 13) having a frontwardly projecting spring guide 123 near its upper edge.

As shown in FIGURES 9 and 10, the slide member 68 has a substantially U-shaped front portion 126 with an upper arm 127 connected at its rear end by means of the web 128 to the lower arm 129. The lower arm 129 is slidably disposed within an opening 132 in the guide projection 83 for movement toward and away from the pivot block 103, preferably substantially along the central axis of the lock collar 86. The upper arm 127 contains in its front end a casing recess 133 into which the rear end of the casing 67 is slidably and snugly received. An integral spring guide 134 extends from rearward end of the upper arm 127 substantially coaxial with both the casing recess 133 and the spring guide 123 on the flange 122 of the actuating member 113. Resilient means, such as a spiral spring 136 is sleeved upon, and held under compression between, the spring guides 123 and 134, whereby the lower arm 129 is urged forwardly into the opening 132.

A slot 137 (FIGURE 10) is provided in the upper edge of the flange 122 so that it extends downwardly approximately halfway through the spring guide 123. A similar slot 138 is provided in the upper edge of the upper arm 127 as well as the spring guide 134 so that it communicates with the casing recess 133. The slots 137 and 138 (FIGURE 1) are slightly wider than the thickness of the flexible element 64 which has an enlargement 139 at its rearward end. The flexible element 64 extends through the slots 137 and 138 and through the center of the spiral spring 136 so that the enlargement 139 on the end thereof bears against the rear surface of the upwardly extending flange 122 on the actuating member 113.

The spring 136 (FIGURE 2) tends to pull the flexible element 64 out of the casing 67 and is opposed by the spring 56 which acts through the reflective member 36, the lever 57 and the pivot arm 33 to urge the element 64 in the opposite direction. That is, movement of the flexible element 64 through, and with respect to, the casing 67 is urged in opposite directions by the springs 56 and 136 which are, in effect, held under compression between the opposite ends of the flexible element 64 and the adjacent ends of the cable casing 67. The springs 56 and 136 are selected so that neither tends to overpower the other and so that the frictional engagement between the flexible element 64 and the surrounding casing 67 caused in part by said springs tends to hold the flexible element 64 in any selected position with respect to the casing 67 in which it is placed by means of the pivotal movement of the actuating member 113.

The slide member 68 (FIGURES 9 and 10) has an L-shaped portion 141 which is integral with, and extends sidewardly and rearwardly from, the web 128 of the front portion 126. The lengthwise flange 142 contains a sidewardly opening slot 143 which is terminated at its rearward end by an integral, cylindrical element 144 which is slidably and snugly received into the slot 121 in the yoke 120 on the pivot block 103.

Accordingly, when the actuating member 113 is pivoted around the common axis of the stud shafts 114 and 115, the slide member 68 is held against movement with respect to the dash panel 89 and the flange 122 is moved toward or away from said panel. Thus, the casing 67 is held against movement and the flexible element 64 is moved therein and with respect to the base structure 13 upon which the slave unit 11 is mounted. Similarly, when the actuating member 113 is pivoted around the axis of the pivot pin 94, the engagement between the element 144 and the yoke 120 acts through the rear portion 141 of the slide member 68 to effect front and rear sliding movement of the lower arm 129 within the opening 132. In this situation the flange 122, and consequently the flexible element 64 fastened thereto, is held against movement with respect to the dash panel 89 and the casing 67 is moved toward or away from said dash panel 89 and with respect to the base structure 13 upon which the slave unit 11 is mounted.

*Assembly and Operation*

It will be apparent that the assembly and installation of the remotely adjustable rearview mirror 10 can be carried out in several ways while producing the same end result. For example, the assembly may be commenced by placing the hood 14 (FIGURE 1) upon the post 20 of the pedestal 13 after which the spring 26 and nut 25 are positioned for holding said hood and pedestal in pivotal relationship. Tightening of the set screw 27 preferably awaits the final mounting of the pedestal 13 upon the vehicle with which it is used and the proper alignment of the hood 14 with the driver's position in the vehicle. The assembly including the bracket 22, the pivot arm 33 and the lever 57 is mounted upon the bosses 18 and 19 by means of the screws 28.

The rear, manually, engageable end of the actuating member 113 is inserted through the opening 84 in the rear flange 81 of the base member 80. The lower arm 129 of the slide member 68 is inserted into the opening 132 in the guide projection 83 on said base member 80. The slide member 68 is moved forwardly and the actuating member 113 is moved rearwardly as far as they will go with respect to the base member 80, after which the pivot block 103 is placed upon the lower flange 82 of the base member 80 between the legs 108 and 109 of the fork 112 on the actuating member 113. The block 103 is then moved with respect to the base member 80 by means of said actuating member 113 (FIGURE 5) until the cylindrical element 144 at the rearward end of the slide member 68 is received into the slot 121 in the yoke 120 on the pivot block 103. The pivot block 103 and the actuating member 113 are then adjusted as necessary until the threaded opening 104 (FIGURE 7) in said pivot block 103 is axially aligned with the pin opening 93 in the lower flange 82 of the base member 80 so that the pivot pin 94 can slide through the opening 93 and be threadedly engaged with the pivot block 103.

One end of a casing 67 (FIGURE 1), which has a flexible element 64 disposed therein, is inserted into the casing recess 133 in the upper arm 127 of the slide member 68. The element 64 extends through the slot 138 toward flange 122. The spiral spring 136 is sleeved upon the extended end of said element 64. Said spring 136 is then axially compressed so that its ends can be sleeved upon the spring guides 123 and 134. At the same time, the element 64 is inserted into the slot 137 in the flange 122 so that the enlargement 139 bears against the rearward side of the flange 122. The mirror assembly 10 including the slave unit 11 and control device 12 are now ready for installation, which may proceed as follows.

The pedestal 113 (FIGURE 1) is mounted upon any suitable means, such as the fender 15 of a vehicle, so that the cavity 73 in the pedestal 13 communicates with an opening 74 in said fender. The rearward end of the actuating member 113 is inserted through an opening 88 in the dash panel 89 near the operator's position so that the opening 84 in the rear flange 81 of the base member 80 is substantially aligned with the opening 88 in the panel 89. The lock collar 86 is sleeved upon the actuating member 113 and inserted through said opening 88 in the dash panel 89 for threaded engagement with the threaded opening 84 for the purpose of gripping the surrounding portion of the dash panel 89 snugly between the rear flange 81 and flange 92 on the lock collar 86. The actuating member 113 is placed in the neutral or centered position, as appearing in FIGURES 1 and 5, after which the casing 67 and flexible element 64 are led through the vehicle so that the front end thereof can be inserted through the opening 74 in the fender 15, through the cavity 73 in the pedestal 13, and through the central opening 72 in the post 20.

The flexible element 64 (FIGURE 4) is inserted through the cable opening 63 in the front end of the pivot arm 33 and through the cable opening 65 in the web 59 of the lever 57. The front end of the casing 67 is then inserted into the casing recess 66 after which the flexible element 64 is pulled through the casing 67 until there is a tension thereon. The pivot arm 33 is placed in its substantially horizontal position and the lever 57 is positioned so that it engages the backing plate 37 of the reflective member 36 with said reflective member substantially perpendicular to the central axis of the hood 14. The front end of the flexible element 64 is then bent around the web 59 of the lever 57 and secured to said lever by the screw 69.

The spring 56 is sleeved upon the guide element 54 and the spring clip 41 (FIGURE 1) on the reflective member 36 is mounted upon the rear end of the pivot arm 33 so that the projections 52 and 53 are received into the openings 48 and 49. The hood 14 is now pivoted on the post 20 into the desired position after which the set screw 27 is tightened against said post 20 and the mirror assembly 10 is ready for operation.

By pivoting the actuating member 113 around an axis defined by the stub shafts 114 and 115, the flexible element 64 is moved forwardly or rearwardly through the cable casing 67 which will remain unmoved with respect to the control device 12 and slave unit 11. Such movement of the flexible element 64 will effect a pivoting of the lever 57 around the lever pin 58 which acts through the arm 62 to pivot the reflective member 36 with respect to the pivot arm 33 around the common, generally vertical axis defined by the projections 52 and 53 on said pivot arm 33. Pivoting of the reflective member around the projections 52 and 53 will be opposed in one direction by compression of the spring 56 and in the other direction by compression of the spring 136.

When the actuating member 113 is pivoted around the axis defined by pivot pin 94, the pivot block 103 will act through its yoke 120 and the pin 144 engaged thereby to move the slide member 68 forwardly or rearwardly and thereby cause the casing 67 to be moved correspondingly with respect to, and lengthwise of, the flexible element 64. The flexible element 64 will be held against frontward movement with the casing 67 by the flange 122 on the actuating member 113. Rearward movement of the element 64 with said casing 67 requires movement of the lever 57 which is opposed by compression of the spring 56 (FIGURE 2) between the bracket 22 and the reflective member 36. The movement of the casing 67 will produce a corresponding upward or downward pivoting of the pivot arm 33, and a corresponding pivoting of the reflective member 36 around the axis of the pivot pin 34. Such pivotal movement will be opposed in one direction by compression of the spring 56 and in the other direction by compression of the spring 136.

Pivotal movements of the actuating member 113, which are in a direction other than vertical or horizontal, will produce various combinations of movements of both the flexible element 64 and the casing 67 which, in turn, will effect similar combinations of pivotal movements of the reflective member 36 around the transverse pivot axes thereof. It follows, therefore, that the reflective member 36 can be accurately adjusted substantially around any line parallel with the median position of the reflective member 36 and passing through the point of intersection between the axis of the pivot pin 34 and the common axis of the projections 52 and 53.

Although a particular preferred embodiment of the invention has been disclosed above in detail for illustrative purposes, it will be understood that variations or modifications of such disclosure, which lie within the scope of the appended claims, are fully contemplated.

What is claimed is:

1. Mechanism for supporting and remotely adjusting the reflective member of a rearview mirror, comprising: a support; bracket means on said support; an arm supported upon said bracket for pivotal movement around a first axis spaced from the reflective surface of said reflective member; means on said reflective member pivotally engaging said arm for movement around a second axis transverse of said first axis, said first and second axes defining a plane substantially parallel with a median position of said reflective surface; first resilient means resiliently engaging said reflective member with respect to said support in first rotational bias around both of said first and second axes; a lever pivotally supported on said bracket and engageable with said reflective member for urging pivotal movement thereof around said second axis against said resilient bias; an elongated flexible element secured at one end to said lever for effecting pivotal movement thereof; a casing snugly and slidably surrounding said flexible element and engaging at one end thereof said arm for effecting pivotal movement thereof around said first axis against said resilient bias; control means secured to said flexible element and said casing at points thereon spaced materially from said arm and said lever; and second resilient means associated with said control means and urging said lever and said arm to pivot said reflective member in opposition to said first resilient means and around said first and second axes, whereby said flexible element is continuously held under tension with respect to said casing.

2. A remotely controllable rearview mirror, comprising: a support; a bracket supported upon said support; a first pivot through said bracket; an arm pivotally supported upon said pivot for movement around a first axis; a reflective member; a second pivot upon said arm defining a second axis transverse of said first axis, said first and second axes lying in planes parallel with and spaced from the plane defined by said reflective member in its median position; clip means pivotally securing said reflective member to said second pivot resilient means extending between and held under compression between said bracket and said reflective member, said resilient means being disposed below said first axis and to one side of said second axis for urging rotation of said reflective member around both axes; a lever pivotally supported upon said bracket and engageable with said reflective member at a point on the other side of said second axis and substantially horizontally aligned with said first axis; an elongated flexible element secured at one end of said lever for effecting said engagement between said lever and said reflective member, whereby said reflective member is urged around said second axis in the opposite direction; an elongated casing snugly and slidably surrounding said elongated element, one end of said casing being engageable with said arm for effecting pivotal movement thereof whereby said reflective member is pivoted around the first axis in the opposite direction; a control device engageable with said elongated element and said casing for selectively effecting lengthwise relative movement of said element and said casing, whereby pivotal movements of said reflective member and said lever are effected separately and in combination.

3. The structure of claim 2 wherein said control device includes a base member; an actuating member supported upon said base member for movement around substantially perpendicular axes, said actuating member including three arms extending from a line perpendicular to both of said pivot axes in directions substantially perpendicular to each other, two of said arms extending perpendicularly to the axes of said elongated element and said casing, one of said two arms being secured to said elongated element and the other of said two arms being connected to said casing, whereby movement of said third arm around one of said axes effects a corresponding movement of said reflective member.

4. In a sheathed cable remote control structure for adjustment of rearview mirrors: a mirror; a bracket behind said mirror; a spring between said bracket and said mirror; a pair of levers pivotal on said bracket and supporting said mirror for rotation on a pair of transverse axes, both of said levers acting against said spring bias; a tubular sheath and cable member, the sheath portion being secured to one of said lever members, the cable portion being secured to the other of said lever members; and a control structure selectively moving the cable and sheath portion of said tubular sheath and cable member in respect to each other thereby causing remote corresponding movement in said mirror.

5. A mechanism for remote universal-like control of a rearview mirror comprising: a mirror element; a support bracket back of said mirror; a spring bias acting upon said mirror and said bracket; clip means secured to said mirror; a pivot through said bracket; a pivot arm pivotal in said bracket on said pivot and secured to said clip thereby correspondingly tilting said mirror in opposition to said spring; a transverse pivot through said pivot arm and forming an axis of rotation for said clip transverse to the pivot for said arm; a lever pivotal upon said bracket and selectively engageable with said mirror in opposition to said spring; a control member including a tubular cable sheath and a cable core piece each movable in respect to the other, said cable being secured to one of said pivotal members and said tubular sheath being secured to the other of said pivotal members; and means remote from said mirror and secured to the other ends of said cable and said sheath for selected relative movement of said cable to said sheath thereby moving said mirror in a selected manner.

6. In the device as defined in claim 5 wherein the means secured to the ends opposite from said pivotal members comprises: a remotely mounted body member having an axial opening therethrough; an actuating arm through said body member and secured to one of said tubular sheath-cable members; a slide-member axially slidable in said body and secured to the other of said tubular sheath-cable members; a spring bias intermediate said slide member and said actuating arm; a first pivot upon which said actuating arm is pivotal allowing said arm to move into and out of proximate contact with said slide member; a second pivot transverse to said first pivot about which said actuating arm is rotatable; and a shoulder upon said actuating arm causing relative sliding movement of said slider member in said body upon rotation of said lever about said second pivot.

7. In a mechanism for providing limited universal remote adjustment of a rearview mirror, the structure comprising: a rearview mirror; a spring clip secured to the center of said mirror; a pivot arm secured at one end to said spring clip; a pivot pin through said pivot arm intermediate the ends thereof and about which said pivot arm rotates; projections extending from said pivot arm transversely of said pivot pin establishing an axis upon which said spring clip is rotatable; a bracket providing a mount for said pivot pin; a lever arm pivotal on said bracket and selectively engaging said mirror at a point offset from the center of said mirror; a spring bias acting upon said bracket and said mirror and acting against said lever arm and said pivot arm; a cable element at one end secured to said lever arm; a tubular element concentrically sheathing said cable element and movable in respect thereto at one end thereof secured to said pivot arm; and means remote from said mirror and connected to said tubular sheath and said cable to selectively move said pivot arm and said sheath thereby causing controlled movement of said mirror.

8. In a remote control structure for rearview mirrors the combination comprising: a flexible cable; a flexible tubular sheath about said cable; a mirror support bracket at one end of said cable and said sheath; a mirror element; a pair of level elements pivotal on said bracket and each operatively secured to one of said sheath and said cable elements, and against which said mirror moves on transverse axes; a spring element between said bracket and said mirror providing a bias against said levers; an actuating arm remote from said mirror and attached to one of said sheath and said cable elements; an actuating arm support body in which said actuating arm is positioned; a slider element axially movable in said body and secured to the other of said sheath and said cable elements; a spring intermediate said slider element and said actuating arm; a first pivot about which said actuating arm is rotatable thereby closing said arm toward and away from said slider element; and a second pivot, transverse to said first pivot about which said actuating arm is rotatable; and an extension from said rotating arm against said slider so that upon rotation of said arm about said second pivot said slider element is moved lineally.

References Cited in the file of this patent

UNITED STATES PATENTS

| | | |
|---|---|---|
| 1,499,640 | Copeland | July 1, 1924 |
| 2,567,324 | Davis | Sept. 11, 1951 |
| 2,573,127 | Von Bredow | Oct. 30, 1951 |
| 2,734,997 | Frady | Feb. 14, 1956 |